US 12,254,859 B2

(12) United States Patent
Fong (10) Patent No.: US 12,254,859 B2
(45) Date of Patent: Mar. 18, 2025

(54) NOISE CANCELLATION FOR AERIAL VEHICLE (71) Applicant: Skydio, Inc., San Mateo, CA (US)

(72) Inventor: Gary Fong, Cupertino, CA (US)

(73) Assignee: Skydio, Inc., San Mateo, CA (US)

( * ) Notice: Subject to any disclaimer, the term of this patent is extended or adjusted under 35 U.S.C. 154(b) by 0 days.

(21) Appl. No.: 18/197,492

(22) Filed: May 15, 2023

(65) Prior Publication Data

US 2023/0290327 A1  Sep. 14, 2023

Related U.S. Application Data (63) Continuation of application No. 17/331,987, filed on May 27, 2021, now Pat. No. 11,670,274, which is a (Continued)

(51) Int. Cl.
*G10K 11/178* (2006.01)
*B64D 47/08* (2006.01)
(Continued)

(52) U.S. Cl.
CPC ............ *G10K 11/178* (2013.01); *B64U 20/20* (2023.01); *B64U 20/87* (2023.01); *B64U 30/293* (2023.01); *B64U 50/13* (2023.01); *H04R 3/04* (2013.01); *B64D 47/08* (2013.01); *B64U 10/13* (2023.01); *B64U 60/50* (2023.01); *B64U 2101/30* (2023.01); *B64U 2201/20* (2023.01);
(Continued)

(58) Field of Classification Search
CPC ............ G10K 11/178; G10K 11/1784; G10K 2210/1281; G10K 2210/3028; H04R 3/04; H04R 3/005; H04R 2410/07; H04R 2499/13; B64C 39/024; B64D 47/08; B64U 50/13; B64U 10/13; B64U 10/14; B64U 20/20; B64U 20/87; B64U 30/293; B64U 2101/30; B64U 2201/20; B64U 60/50

See application file for complete search history.

(56) References Cited

U.S. PATENT DOCUMENTS 9,489,937 B1 * 11/2016 Beard .................. G10K 11/178
9,984,672 B2    5/2018 Fong
(Continued)

FOREIGN PATENT DOCUMENTS

JP      2017213970 A     12/2017
WO   WO-2016118626 A1 *  7/2016 ............. B64U 10/13

OTHER PUBLICATIONS

Ishiki et al. (Design Model of Microphone Arrays for Multirotor Helicopters), Sep. 28-Oct. 2, 2015 https ://ieeexplore.ieee.org/document/7354252?source=IQpl us https://ieeexplore.ieee.org/stamp/stamp.jsp?tp=&arnumber=7354252 (Year: 2015).

*Primary Examiner* — Yogeshkumar Patel
(74) *Attorney, Agent, or Firm* — Young Basile Hanlon & MacFarlane, P.C.

(57) ABSTRACT

A system including a noise analyzer, a filter, and a memory. The noise analyzer configured to review a captured audio signal, wherein the captured audio signal comprises baseline noise parameters and clean audio. The filter configured to remove the baseline noise parameters from the captured audio signal so that the clean audio is free of the baseline noise parameters. The memory stores the clean audio.

20 Claims, 7 Drawing Sheets

Related U.S. Application Data continuation of application No. 16/751,268, filed on Jan. 24, 2020, now Pat. No. 11,024,279, which is a continuation of application No. 15/972,533, filed on May 7, 2018, now Pat. No. 10,546,571, which is a continuation of application No. 15/267,102, filed on Sep. 15, 2016, now Pat. No. 9,984,672.

(51) Int. Cl.

| | | |
|---|---|---|
| *B64U 10/13* | (2023.01) | |
| *B64U 20/20* | (2023.01) | |
| *B64U 20/87* | (2023.01) | |
| *B64U 30/293* | (2023.01) | |
| *B64U 50/13* | (2023.01) | |
| *B64U 60/50* | (2023.01) | |
| *B64U 101/30* | (2023.01) | |
| *H04R 3/00* | (2006.01) | |
| *H04R 3/04* | (2006.01) | |

(52) U.S. Cl.
CPC ............. *G10K 2210/1281* (2013.01); *G10K 2210/3028* (2013.01); *H04R 3/005* (2013.01); *H04R 2410/07* (2013.01); *H04R 2499/13* (2013.01)

(56) References Cited

U.S. PATENT DOCUMENTS

| | | |
|---|---|---|
| 10,546,571 B2 | 1/2020 | Fong |
| 11,024,279 B2 | 6/2021 | Fong |
| 2015/0336671 A1 | 11/2015 | Winn |
| 2016/0063987 A1* | 3/2016 | Xu .................. G10K 11/17881 381/71.14 |
| 2016/0070264 A1 | 3/2016 | Hu |
| 2017/0274984 A1 | 9/2017 | Beckman |
| 2018/0075834 A1 | 3/2018 | Fong |
| 2018/0322860 A1 | 11/2018 | Fong |
| 2020/0160825 A1 | 5/2020 | Fong |
| 2021/0358469 A1 | 11/2021 | Fong |

\* cited by examiner

NOISE CANCELLATION FOR AERIAL VEHICLE

CROSS REFERENCE TO RELATED APPLICATIONS

This application is a continuation of U.S. application Ser. No. 17/331,987, filed May 27, 2021, which is a continuation of U.S. application Ser. No. 16/751,268, filed Jan. 24, 2020, now U.S. Pat. No. 11,024,279, which is a continuation of U.S. application Ser. No. 15/972,533, filed on May 7, 2018, now U.S. Pat. No. 10,546,571, which is a continuation of U.S. application Ser. No. 15/267,102, filed on Sep. 15, 2016, now U.S. Pat. No. 9,984,672, the contents of which are incorporated by reference in their entirety.

TECHNICAL FIELD

The disclosure generally relates to the field of cameras and operation on a remote controlled vehicle.

BACKGROUND

Video cameras mounted or integrated with remote controlled aerial vehicles, e.g., quadcopters or drones, are known. The video camera captures video images as the remote control aerial vehicle is flown remotely by a user.

In addition to capturing video images, the camera also captures audio through a microphone. However, the microphone also captures noise from components on the aerial vehicle, e.g., the motors, propellers, mechanical component movements, etc. Hence, the captured audio is noisier than desired.

SUMMARY

The present teachings provide A system including a noise analyzer, a filter, and a memory. The noise analyzer configured to review a captured audio signal, wherein the captured audio signal comprises baseline noise parameters and clean audio. The filter configured to remove the baseline noise parameters from the captured audio signal so that the clean audio is free of the baseline noise parameters. The memory stores the clean audio.

The present teachings provide an unmanned aerial vehicle including components, a noise analyzer, a filter, and memory. The components are on the unmanned aerial vehicle. The noise analyzer configured to analyze an audio signal and generate an analyzed audio signal, wherein the audio signal comprises noise associated with operation of the components on the unmanned aerial vehicle. The filter configured to modify the audio signal based by removing the noise associated with the operation of the components on the unmanned aerial vehicle based on the analyzed audio signal to produce a filtered audio signal. The memory is configured to store the filtered audio signal.

The present teachings provide a method including receiving an audio signal. Analyzing the audio signal with a noise analyzer, wherein the audio signal comprises baseline noise parameters and audio. Filtering the audio signal, with a filter, based on the baseline noise parameters. Storing the audio in memory.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiments is a remote controlled aerial vehicle with camera and mounting configuration. The remote controlled aerial vehicle may be referred to as a drone. The remote controlled aerial vehicle may include a number of mechanical components. For example, there may be two or more motors. Each motor may include a propeller. In addition the remote controlled aerial vehicle may include movable (e.g., foldable) arms, landing gear, and/or a cooling fan. The arms and the landing gear may include motors to allow for automatic extension and retraction. Other mechanical components may include a gimbal that may have one or more motors, a camera frame coupled with the gimbal and/or a camera. The mechanical components may generate noise, e.g., when the aerial vehicle is operation such as in flight, and may be considered noise generating components. While the various motors may generate noise, other components that do not have motors also may generate noise due to tolerances and normal mechanical movements. The noise may be transmitted through the air or through vibrations as further described below.

The remote controlled aerial vehicle also may include an integrated camera system. Alternately, the remote controlled aerial vehicle may include a removable mounting configuration that secures a camera system. The integrated camera system as well as the removable mounting configuration may include (or couple with) a gimbal. The gimbal includes one or more gimbal motors that move the camera system (or camera attachment) into a particular position for capturing images in that position. The gimbal motors also may generate audible noise.

The remote controlled aerial vehicle with camera system may include and/or incorporate with a noise cancellation system. The noise cancellation system is configured to capture audible noise through a microphone on the camera system. The captured audible noise becomes an audio signal within the camera system. The camera system may be configured to include a noise analyzer. The noise analyzer receives the audio signal and metadata. The metadata may correspond to information corresponding to a type of the camera system and a type of the remote controlled aerial vehicle. For example, the metadata may include noise information associated with noise generating sources of the remote controlled aerial vehicle when the aerial vehicle was operational and the camera was capturing audio. The noise generating sources may be, for example, mechanical (e.g., motors, propeller, mechanical vibrations), aerodynamics (or operational) (e.g., velocity, acceleration, drive current, drive waveform) and/or environmental (e.g., wind speeds, wind direction). The audio signal and the metadata may be further processed through a noise filter. The noise filter may be configured to use the metadata to determine a noise filter to apply and clean the audio signal. The noise filter may be embodied as a look up table filter or may be embodied as a spectral noise filter.

Example System Configuration

Figure 1:
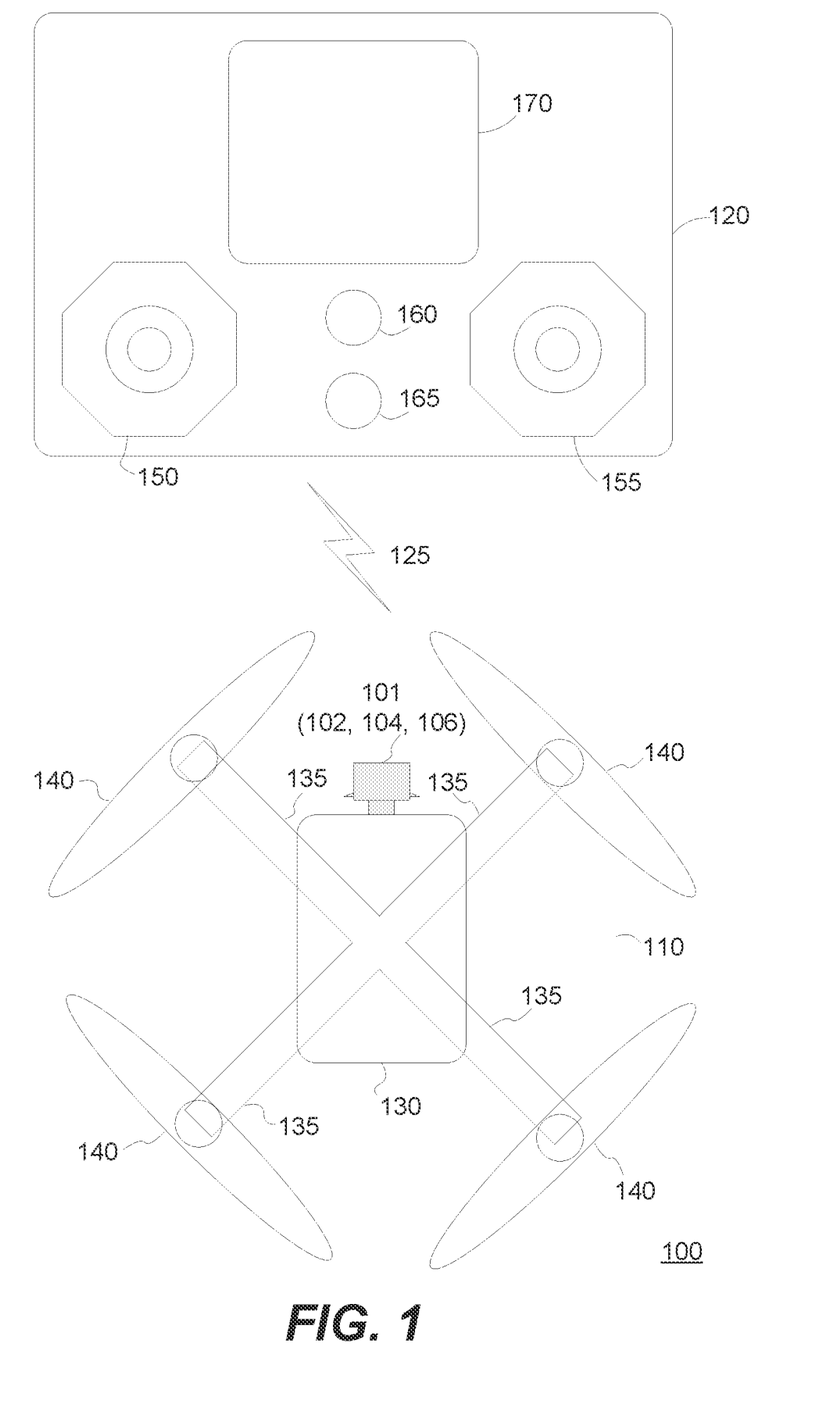
FIG. 1 illustrates an example configuration of remote controlled aerial vehicle in communication with a remote controller.

Turning now to Figure (FIG. 1, it illustrates an example configuration 100 of remote controlled aerial vehicle in communication with a remote controller. The configuration 100 may include a remote controlled aerial vehicle ("aerial vehicle") 110 and a remote controller 120. The aerial vehicle 110 and the remote controller 120 are communicatively coupled through a wireless link 125. The wireless link can be a Wi-Fi link, cellular (e.g., long term evolution (LTE), 3G, 4G, 5G) or other wireless communication link. The aerial vehicle 110 can be, for example, a quadcopter or other multirotor helicopter.

The aerial vehicle 110 in this example may include a housing 130 for payload (e.g., processing, communication and power electronics, storage media, cooling fan), two or more mechanical arms (or arms) 135, and two or more propellers 140. The arms 135 may be foldable. They may retract in close proximity to the housing 130, e.g., for storage, or example outward away from the housing 130 for flight. Each arm 135 mechanically couples with a propeller 140 to create a rotary assembly. When the rotary assembly is operational, all the propellers 140 spin at appropriate speeds to allow the aerial vehicle 110 lift (take off), land, hover, and move (forward, backward) in flight. In the example as shown, the aerial vehicle 110 also may include a camera mounting assembly 101 that includes a gimbal 102, a camera 104, and camera housing 106.

The remote controller 120 in this example may include a first control panel 150 and a second control panel 155, an ignition button 160, a return button 165 and a display 170. A first control panel, e.g., 150, can be used to control "up-down" direction (e.g. lift and landing) of the aerial vehicle 110. A second control panel, e.g., 155, can be used to control "forward-reverse" direction of the aerial vehicle 110. Each control panel 150, 155 can be structurally configured as a joystick controller and/or touch pad controller. The ignition button 160 can be used to start the motors of the aerial vehicle 110 that, in turn, starts the propellers 140). The return (or come home) button 165 can be used to override the controls of the remote controller 120 and transmit instructions to the aerial vehicle 110 to return to a predefined location as further described herein. The ignition button 160 and the return button 165 can be mechanical and/or solid state press sensitive buttons. In addition, each button may be illuminated with one or more light emitting diodes (LED) to provide additional details. For example the LED may switch from one visual state to another to indicate with respect to the ignition button 160 whether the aerial vehicle 110 is ready to fly (e.g., lit green) or not (e.g., lit red) or whether the aerial vehicle 110 is now in an override mode on return path (e.g., lit yellow) or not (e.g., lit red). It also is noted that the remote controller 120 can include other dedicated hardware buttons and switches and those buttons and switches may be solid state buttons and switches.

The remote controller 120 also includes a screen (or display) 170. The screen 170 provides for visual display. The screen 170 can be a touch sensitive screen. The screen 170 also can be, for example, a liquid crystal display (LCD), an LED display, an organic LED (OLED) display or a plasma screen. The screen 170 allows for display of information related to the remote controller, such as menus for configuring the controller 120 or remotely configuring the aerial vehicle 110. The screen 170 also can display images captured from a camera coupled with the aerial vehicle 110.

Example Remote Controlled Aerial Vehicle

Figure 2:
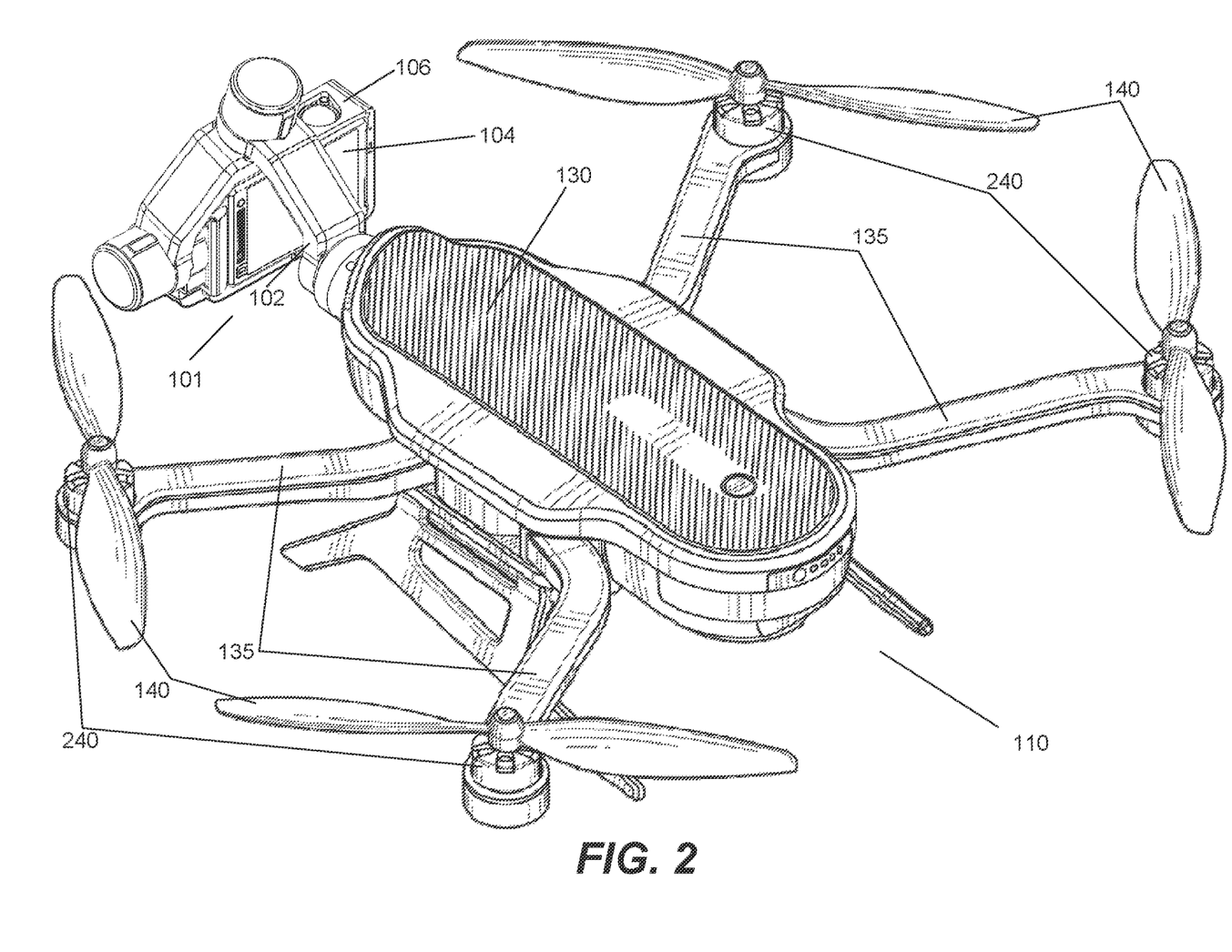
FIG. 2 illustrates an example of a remote controlled aerial vehicle.

FIG. 2 illustrates an example embodiment of an aerial vehicle 110. More specifically, the aerial vehicle 110 in this example is a quadcopter (i.e., a helicopter with four motors and corresponding propellers). The aerial vehicle 110 in this example includes housing 106 which encloses a payload (e.g., electronics, cooling fan, storage media, and/or camera), four mechanical arms (or arms) 235, four motors 240, and four propellers 140. Each arm 135 mechanically couples with a motor 240. The motor 240 couples with a propeller 140 to create a rotary assembly. When the rotary assembly is operational, all the propellers 140 spin at appropriate speeds (and rotary direction) to allow the aerial vehicle 110 lift (take off), land, hover, and move (forward, backward) in flight.

A gimbal 102 is shown coupled to the aerial vehicle 110. A camera 104 is shown enclosed in a removable camera frame 106 which is attached the gimbal 102. The gimbal 102 is coupled to the housing 130 of the aerial vehicle 110 through a removable coupling mechanism that mates with a reciprocal mechanism on the aerial vehicle 110 having mechanical and communicative capabilities. The gimbal 102 can be removed from the aerial vehicle 110. The gimbal 102 can also be removably attached to a variety of other mount platforms, such as a handheld grip, a ground vehicle, and a generic mount, which can itself be attached to a variety of platforms. In some embodiments, the gimbal 102 can be attached or removed from a mount platform 110 without the use of tools. The gimbal 102 may include one or more motors that can be used to adjust the position of the camera frame 106, and ultimately, the camera 104.

Example Electronics and Control System for Aerial Vehicle

Figure 3:
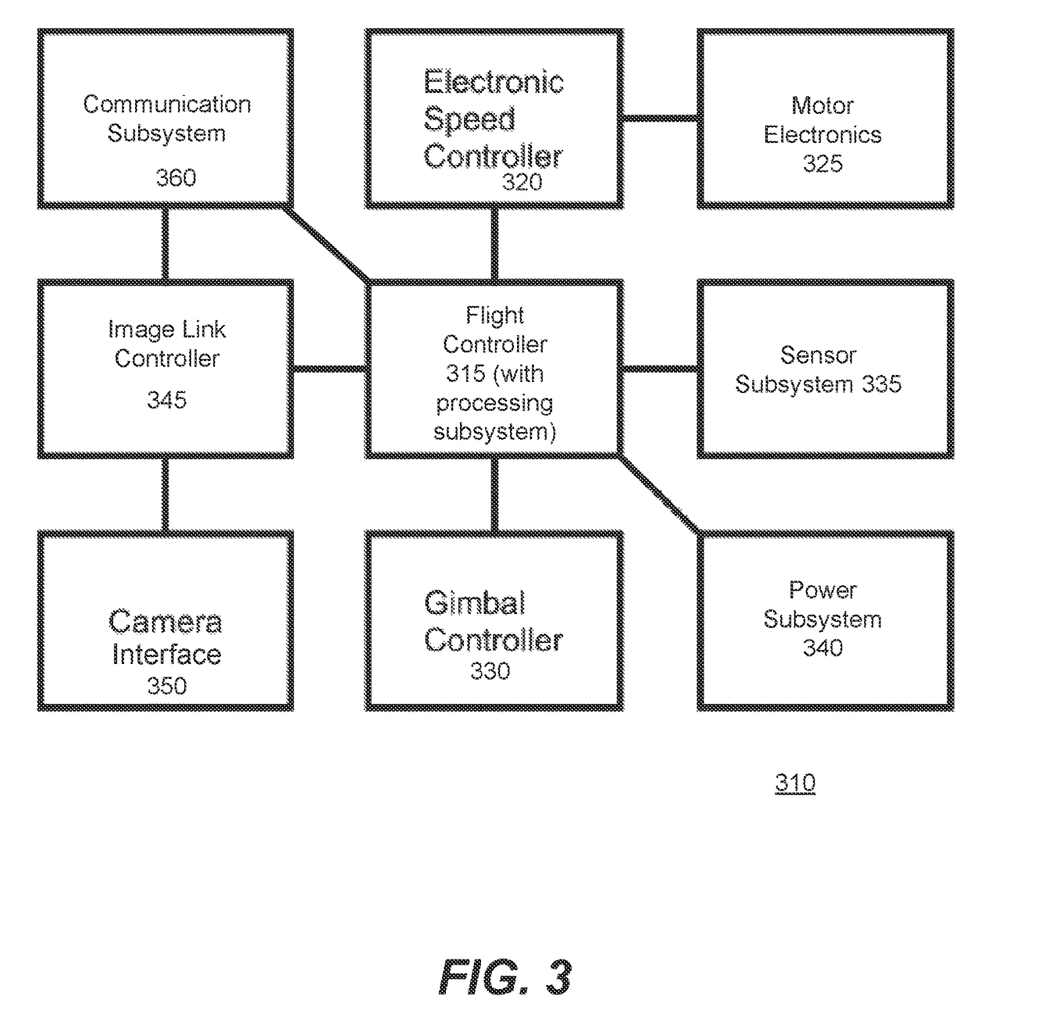
FIG. 3 illustrates an example embodiment of aerial vehicle electronics and control (EC) system 310 of the remote controlled aerial vehicle 110.

FIG. 3 illustrates an example embodiment of an electronics and control (EC) system 310 of the aerial vehicle 110. The example EC system 310 may include a flight controller 315, an electronic speed controller (ESC) 320, one or more motor electronics 325, a gimbal controller 330, a sensor subsystem (which may include telemetric subsystems) 335, a power subsystem 340, an image link controller 345, a camera interface 350, and a long range communication subsystem 360. The components communicate directly or indirectly with each other through a data bus within the aerial vehicle 110.

Figure 8:
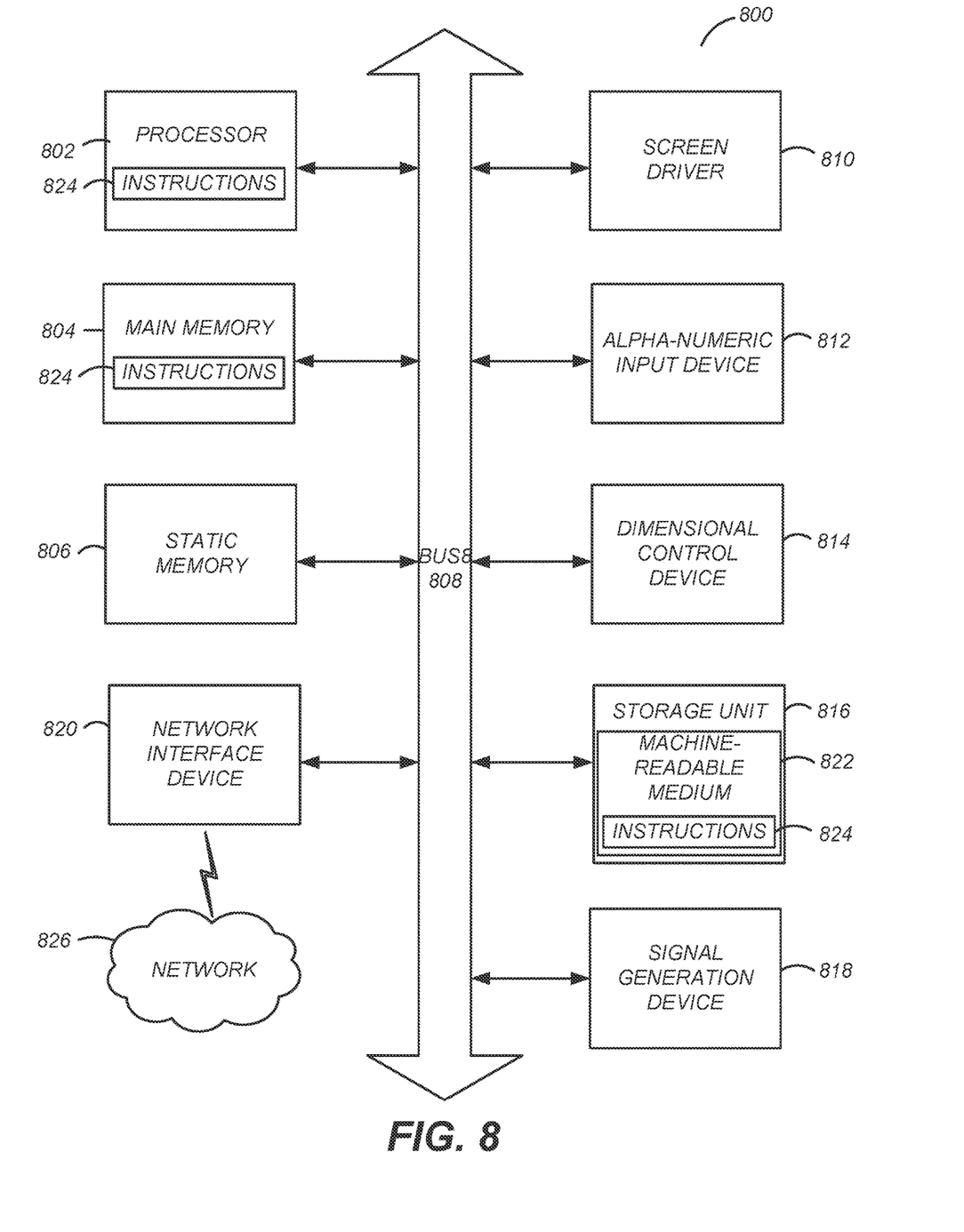
FIG. 8 is a block diagram illustrating components of an example machine able to read instructions from a machine-readable medium and execute them in one or more processors (or controllers).

The aerial vehicle 110 components may be embodied in hardware, software, or a combination thereof. The software, which can include firmware, may be referenced as program code, computer program product, or program instructions, and may be comprised of one or more instructions. Software may include an operating system, which provides an interface to a processor, and on which software applications run (or execute). Software can be executed by one or more processors within the aerial vehicle 110. A processor also may include, for example, controllers, application specific integrated circuits (ASICs) and/or field programmable gate arrays (FPGAs). The processor can be configured to execute the software in a specific manner. FIG. 8 provides an example machine architecture with a processor that can be configured to execute software. It is noted that not all the components of FIG. 8 may be included in the aerial vehicle 110. FIG. 8 is intended to be illustrative in describing an architecture of a computing system, of which all or parts can operate within the aerial vehicle 110 and the EC system 310.

In this example, the aerial vehicle 110 may be configured to include an aerial vehicle operating system (AVOS). By way of example, the AVOS can be built on an operating system kernel, for example, LINUX, and/or be based on an operating system such as ANDROID OS. The software components of aerial vehicle described in the disclosure operate with the AVOS. Examples of these software configurations are found throughout this disclosure.

Turning now to the example components of the EC system 310, a further description of each component is provided. In one example embodiment, the flight controller 315 of the EC system 310 coordinates and processes software for the aerial vehicle 110. The flight controller 315 may integrate the AVOS. Examples of processing directed by the flight controller 315 include coordinating communication with the remote controller 120 through the communication subsystem 360 and processing commands to and from the remote controller 120. The flight controller 315 also may control flight related operations of the aerial vehicle 110 by control over the other components such as the electronic speed controller 320 and the sensor subsystem 335. The flight controller 315 also interfaces with the gimbal control 330 to assist with controlling the gimbal motors of the gimbal 102. In addition, the flight controller 315 may be used to assist with the image link 345 for camera control operations.

Referring now to the electronic speed controller 320, it is configured to interface with the motor electronics 325. The electronic speed controller 320 may be configured to control, via the motor electronics 325, the speed applied by the motors 240 to the propellers 140. The electronic speed controller 320 may control each thrust motor 240 through the motor electronics 325 individually or in groups or subgroups. It is noted that the motor electronics 325 may be integrated with the motors 240.

Next, the gimbal controller 330 may include control electronics (and may include firmware) that may be configured to control operation of the motors for each axis of the gimbal. The gimbal controller 330 receives commands via the flight controller 315. The commands may originate from the remote controller 120, which passes them to the flight controller 315 via the communication subsystem 360.

Turning next to the image link controller 345, it is configured to communicate with the camera interface 345 to transmit commands that can include capture of images from a camera for transmission to the remote controller 120 (and/or other device with screen such as a smart phone or tablet), e.g., via the communication subsystem 360. The images may be overlaid and/or augmented with other data from the aerial vehicle such as the sensor data from the sensor subsystem 335. When images are sent to both the remote controller 120 and another device, the overlaid information may be the same on each device or distinct on each device. It is noted that the image link controller 345 may have a processing configuration that allows commands to be directly transmitted between the communication subsystem 360 and the camera interface 350. Alternately, or in addition, the image link controller 345 may communicate with the flight controller 315 for processing resources and application of software configurations.

The camera interface 350 may be configured to receive camera control commands from the image link controller 345. The camera commands can include commands to set up camera operations, e.g., frame capture rate, still or video images, etc. The camera commands may originate from the remote controller 120 and be received via the communication subsystem 360 and image link controller 345 of the EC system 310.

Turning next to the sensor subsystem 335, it may include one or more sensors. Each set of sensors may be further grouped as sensor modules to gather particular types of data. For example, one sensor module may be for positional sensors and another sensor module may be for environmental sensors. Positional sensors can provide location and/or relative location in space and orientation information of the aerial vehicle 110. Positional sensors can assist with navigation and location related operations of the aerial vehicle 110. Positional sensors can include, for example, a gyroscope, accelerometer, a compass, a global positioning system (GPS) sensor, a motion sensor, and/or an altimeter. Environmental sensors can provide information of a particular environment. For example, environmental sensors can provide information on environmental conditions external to the housing 130 of the aerial vehicle 110. Further by example, environmental sensors can provide information on conditions within the housing 130 of the aerial vehicle 110. Environmental sensors can include, for example, a temperature sensor, a photodetector, a heat sensor, a moisture sensor, and/or a barometric sensor. It is noted that in some example instances an environmental sensor can also operate as a positional sensor for purposes of how the data may be used and vice versa. For example, a photodetector may be used to determine time of day for a flight, but also can be used to detect shadows for avoidance detection during flight of the aerial vehicle 110. Similarly by way of example, a barometric sensor may be used to determine atmospheric pressure and aerial vehicle 110 altitude. Note that other sensor configurations also may be included in addition to the examples given.

The sensor data from the sensor subsystem 335 may comprise sensor metadata and can be integrated with images and/or metadata from a camera. The images from the camera, which may also include additional metadata, can be transmitted wirelessly to other devices and/or stored for later playback. When the images are displayed (e.g., played in real time or from storage), the sensor data can be extracted from it and provided for display on a screen, e.g., the screen 170 of the remote controller 120 or a screen of a computing device (e.g., laptop, smartphone, tablet, desktop computer, etc.). The camera interface 350 can interface with a camera or may include an integrated camera. The integrated camera would be positioned similar to the camera mount 220. Alternately, the camera may incorporate a camera mount.

The power subsystem 340 may be configured to manage and supply power to the components of the EC system 310. The power subsystem 340 can include a battery pack and a protection circuit module as well as a power control/battery management system. The battery can be replaceable and/or rechargeable. The battery of the power subsystem 340 can be configured to charge the camera in flight as needed or pre-flight. Other devices also may be charged using the energy capacity of the battery of the power subsystem 340, for example, the remote controller 120, a powered handheld grip, or a mobile phone. The battery also can be used to charge the camera, or other devices, post-flight, depending on energy remaining in the battery. Further, the power subsystem 340 can be configured to include a dual power path. A first path allows for a first power level, e.g., low current, to be used to power up the aerial vehicle 110 and its onboard components. Once components are powered the aerial vehicle 110 can transition to a second power level, e.g., high current, which is sufficient to consistently drive the motors 240 and onboard components during flight. In addition, a regenerative charging configuration can be integrated into the power subsystem 340. For example, the power subsystem 340 can include a recharge circuit electrically coupled with the motors 240 so that when the motors 240 are decelerating, current is pushed back through the recharge circuit to charge the battery of the power subsystem 340.

The communication subsystem 360 may include communication electronics (and may include corresponding firmware) for the aerial vehicle 110. For example, the communication subsystem 360 can include a long range WiFi system. It can include additional wireless communication components. For example, it may include another WiFi system, which may allow for one WiFi system to be dedicated to direct control communications with the remote controller 120 and the other WiFi system may be used for other communications, such as image transmissions). It can include a communication system such as one based on long term evolution (LTE), 3G, 4G, 5G or other mobile communication standard. The communication subsystem 360 may be configured with a uni-directional remote control channel for communication of controls from the remote controller 120 to the aerial vehicle 110 and a separate unidirectional channel for an image downlink from the aerial vehicle 110 to the remote controller 120 (or to a video receiver where direct image connection may be desired). The communication subsystem 360 can be used to allow for other services, for example, to provide over the air or hardwire link updates, such as firmware updates to the aerial vehicle 110. Some third-party services may be provided access to the communication subsystem 360 or components within via application programming interfaces (API).

Example Camera Architecture

Figure 4:
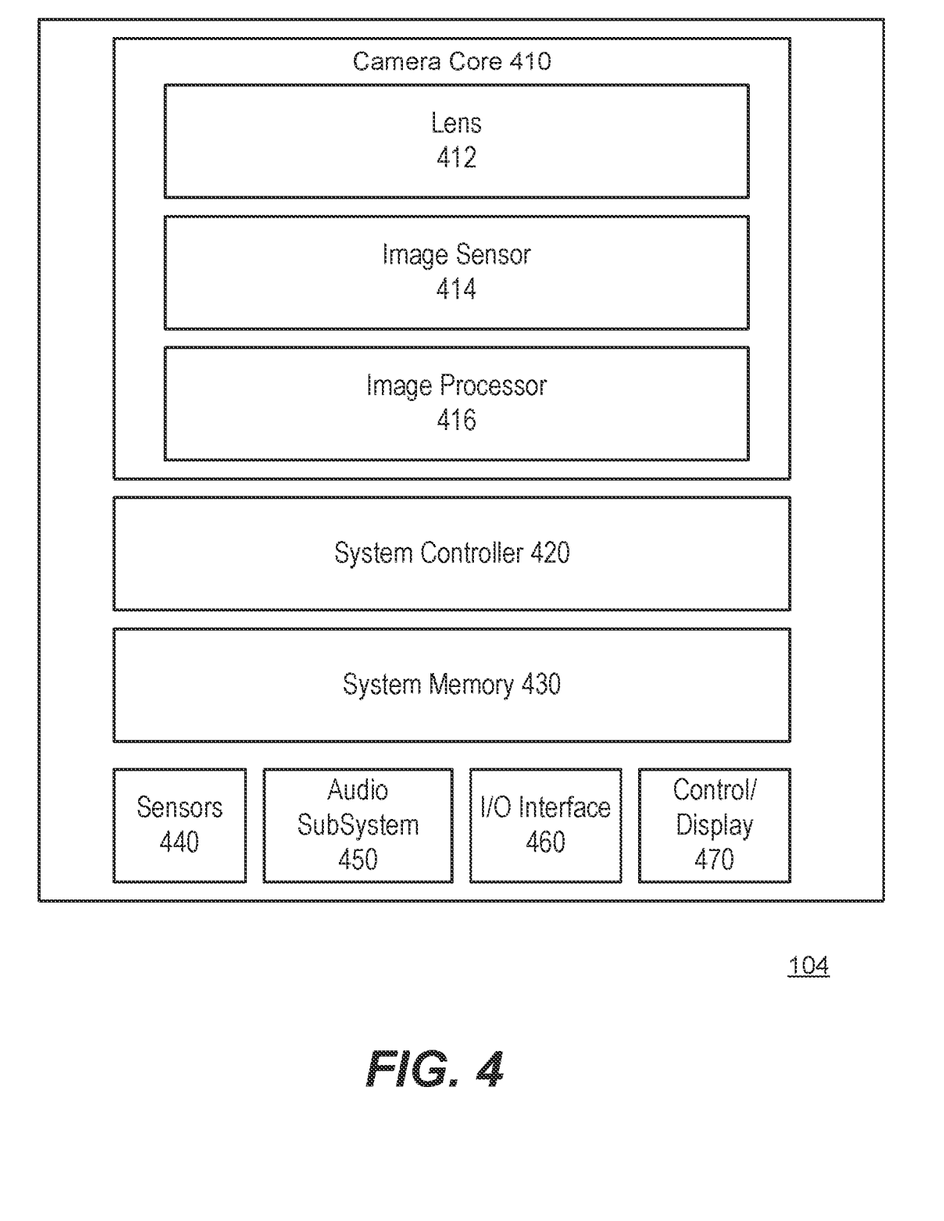
FIG. 4 illustrates a block diagram of an example camera architecture.

FIG. 4 illustrates a block diagram of an example camera architecture 405. The example camera architecture 405 corresponds to an architecture for the camera, e.g., 104. It is noted that the camera 104 may be independent of or integrated with the aerial vehicle 110. When integrated with the aerial vehicle 110, the camera 104 may also be integrated with a gimbal, e.g., 210. Alternately, when independent, the camera 104 may be removably attached to the aerial vehicle 110. When removably attached, the camera 104 may be removably coupled to the gimbal 102 that couples the aerial vehicle 110. As previously noted, the gimbal 102 may be removably coupled with the aerial vehicle 110. Alternately, the gimbal 102 may be integrated with the aerial vehicle 110. For ease of discussion, the camera 104 is described in a configuration where it is removably coupled with the gimbal 102 via a camera mount 220 and the gimbal 102 also is removably coupled with the aerial vehicle 110. However, the principles noted apply also in the instances in which the camera is integrated with the aerial vehicle 110.

Referring briefly to the camera 104 itself, it can include a camera body, one or more a camera lenses, various indicators on the camera body (such as LEDs, displays, and the like), various input mechanisms (such as buttons, switches, and touch-screen mechanisms), and electronics (e.g., imaging electronics, power electronics, metadata sensors, etc.) internal to the camera body for capturing images via the one or more lenses and/or performing other functions. In one embodiment, the camera 104 is capable of capturing spherical or substantially spherical content. As used herein, spherical content may include still images or video having spherical or substantially spherical field of view. For example, in one embodiment, the camera 104 captures video having a 360 degree field of view in the horizontal plane and a 180 degree field of view in the vertical plane. Alternatively, the camera 104 may capture substantially spherical images or video having less than 360 degrees in the horizontal direction and less than 180 degrees in the vertical direction (e.g., within 10% of the field of view associated with fully spherical content). In other embodiments, the camera 104 may capture images or video having a non-spherical wide angle field of view.

As described in greater detail below, the camera 104 may include sensors to capture metadata associated with video data, such as timing data, motion data, speed data, acceleration data, altitude data, GPS data, and the like. In one example embodiment, location and/or time centric metadata (geographic location, time, speed, etc.) can be incorporated into an image (or media) file together with the captured content in order to track over time the location of the camera 104 or the subject being recorded by the camera 104. This and sensor metadata may be captured by the camera 104 itself or by another device proximate to the camera 104 (e.g., a mobile phone, a data tracker worn by a subject (e.g., a smart watch or fitness tracker equipped with tracking software or a dedicated radio frequency tracker), the aerial vehicle 110 via the camera interface 350, etc.).

In one embodiment, the metadata may be incorporated with the content stream by the camera 104 as the content is being captured. In another embodiment, a metadata file separate from the image file may be captured (by the same capture device or a different capture device) and the two separate files can be combined or otherwise processed together in post-processing. It is noted that these sensors can be in addition to the sensors of the sensor subsystem 335. In embodiments in which the camera 104 is integrated with the aerial vehicle 110, the camera need not have (or need not operate) separate individual sensors, but rather could rely upon the sensors integrated with the aerial vehicle 110. The data captured by the sensors may be referenced as sensor metadata. The sensor metadata, as well as camera metadata from the camera 104, may be integrated with and/or used with aerial vehicle metadata captured from sensors on the aerial vehicle 110, for example, the environmental sensors, positional sensors, etc.

Referring now to the example camera architecture 405 of the camera 104, it may include a camera core 410 comprising a lens 412, an image sensor 414, and an image processor 416. The camera 104 also may include a system controller 420 (e.g., a microcontroller or microprocessor) that controls the operation and functionality of the camera 104 and system memory 430 configured to store executable computer instructions that, when executed by the system controller 420 and/or the image processors 416, perform the camera functionalities described herein. In some embodiments, a camera 104 may include multiple camera cores 410 to capture fields of view in different directions which may then be stitched together to form a cohesive image. For example, in an embodiment of a spherical camera system, the camera 104 may include two camera cores 410 each having a hemispherical or hyper hemispherical lens that each captures a hemispherical or hyper hemispherical field of view which is stitched together in post-processing to form a spherical image.

The lens 412 can be, for example, a wide angle lens, hemispherical, or hyper hemispherical lens that focuses light entering the lens to the image sensor 414 which captures video. The image sensor 414 may capture high-definition images having a resolution of, for example, 720p, 1080p, 4 k, or higher. In one embodiment, spherical images may be captured as a 5760 pixels by 2880 pixels with a 360 degree horizontal field of view and a 180 degree vertical field of view. For images, the image sensor 414 may capture images at frame rates of, for example, 30 frames per second, 60 frames per second, 120 frames per second or higher.

The image processor 416 can perform one or more image processing functions of the captured images or video. For example, the image processor 416 may perform a Bayer transformation, demosaicing, noise reduction, image sharpening, image stabilization, rolling shutter artifact reduction, color space conversion, compression, or other in-camera processing functions. The image processor 416 also may be configured to perform real-time stitching of images, for example, when images are capture from two or more cameras coupled with the aerial vehicle 110 and configured to capture images. Such example configurations may include, for example, an activity camera (which may include a spherical image capture camera) that captures images, each with a substantially different field of view (FOV), but where there may be some overlap where the images can be stitched together. Processed images may be temporarily or persistently stored to system memory 430 and/or to a non-volatile storage, which may be in the form of internal storage or an external memory card, as shown and described in the example architecture of FIG. 4.

An input/output (I/O) interface 460 transmits and receives data from various external devices. For example, the I/O interface 460 may facilitate the receiving or transmitting image information through an I/O port. Control information, e.g., from/to a gimbal controller 330, also may be transmitted via the I/O interface 460. Examples of I/O ports or interfaces include USB ports, HDMI ports, Ethernet ports, audio ports, and the like. Furthermore, embodiments of the I/O interface 460 may include wireless ports that can accommodate wireless connections. Examples of wireless ports include BLUETOOTH, Wireless USB, Near Field Communication (NFC), and the like. The I/O interface 460 may also include an interface to synchronize the camera 104 with other cameras or with other external devices, such as a remote control, a second camera, a smartphone, a client device, or a video server. For example, a camera 104 mounted to an aerial vehicle 110 may be synchronized wirelessly (e.g., using time codes) with a camera on another aerial vehicle or on the ground so that video captured by the various cameras can be synchronized.

A control/display subsystem 470 includes various control components associated with operation of the camera 104 including, for example, LED lights, a display, buttons, microphones, speakers, etc. The audio subsystem 450 includes, for example, one or more microphones and one or more audio processors to capture and process audio data correlated with video capture. In one embodiment, the audio subsystem 450 includes a microphone array having two or microphones arranged to obtain directional audio signals.

Sensors 440 capture various metadata concurrently with, or separately from, image capture. For example, the sensors 440 may capture time-stamped location information based on a global positioning system (GPS) sensor. Other sensors 440 may be used to detect and capture orientation of the camera 104 including, for example, an orientation sensor, an accelerometer, a gyroscope, an altimeter, or a magnetometer. Sensor data captured from the various sensors 340 may be processed to generate other types of metadata. For example, sensor data from the accelerometer may be used to generate motion metadata, comprising velocity and/or acceleration vectors representative of motion of the camera 104. Furthermore, sensor data from the aerial vehicle 110 and/or the gimbal 102/gimbal controller 330 may be used to generate orientation metadata describing the orientation of the camera 104. Sensor data from the GPS sensor provides GPS coordinates identifying the location of the camera 104, and the altimeter measures the altitude of the camera 104. In one embodiment, the sensors 440 are rigidly coupled to the camera 104 such that any motion, orientation or change in location experienced by the camera 104 is also experienced by the sensors 440. The sensors 440 furthermore may associate one or more time stamps representing when the data was captured by each sensor. In one embodiment, the sensors 440 automatically begin collecting sensor metadata when the camera 104 begins recording a video. As noted previously, the sensor data from the camera architecture may be integrated with and/or used with sensor data from the aerial vehicle 110. It is noted that in example embodiments in which sensors of a particular type are missing from the aerial vehicle 110, the sensors 440 of the camera 104 can provide the requisite sensor data for appropriate processing operations.

As noted above, the camera 104 may also be controlled remotely, for example, through the remote controller 120, or through other devices in wireless communication with the camera, either directly or through the aerial vehicle 110. Accordingly, control functions of the camera 104 can be manipulated before, during or after flight (e.g., at landing). For example, during flight the camera 104 can be configured to switch from shooting images at 30 frames per second to 60 frames per second (fps). In this example, an aerial vehicle 110 may follow a skier down a slope and start capturing images through the camera 104 at 30 fps. As the skier accelerates, e.g., for a jump, the camera 104 automatically switches to capturing images at 60 fps. Also by way of example, if the skier is in the distance, e.g., 20 meters, the camera 104 may being to capture images at 30 fps, but as the aerial vehicle draws closer, e.g., within 5 meters, the camera 104 can automatically switch to capturing images at 60 fps.

Moreover, an operator may seek to switch the camera 104 from taking images, in one mode, e.g., low resolution images (e.g., lower pixel count, lower frames per second, etc.), to taking images in another mode, e.g., high resolution images (e.g., higher pixel count, higher frames per second, etc.), while the aerial vehicle 110 is in flight and the camera 104 is operational. The positioning of the camera 104 can also be further controlled from an operator on the ground transmitting signals from the remote controller 120 or mobile device to move the camera angle through movement of appropriate gimbal 102 components. Further by example, at landing the camera 104 can be configured to take images, e.g., to assist with location analysis for locating the aerial vehicle 110.

Audio Noise Cancellation Subsystem

Figure 5:
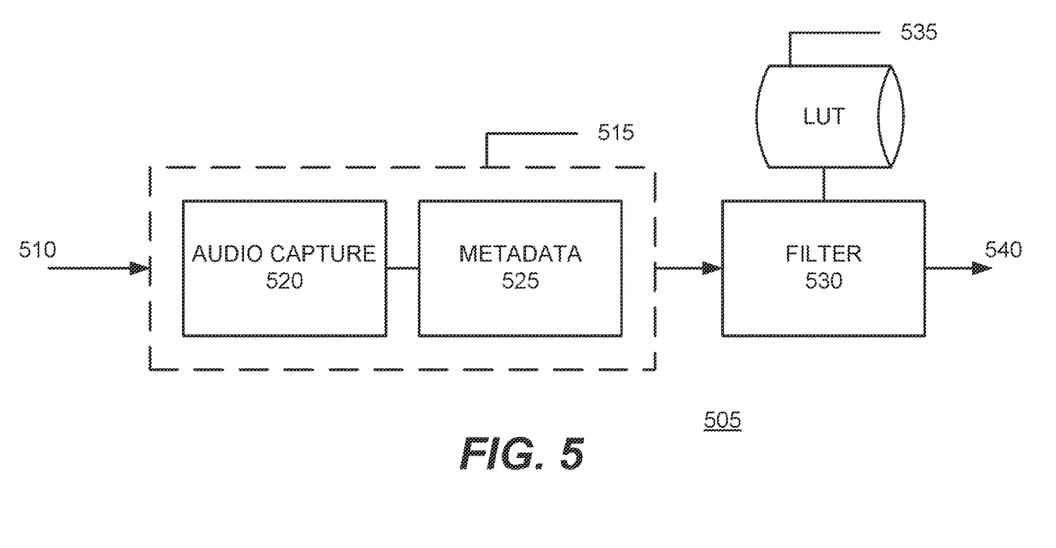
FIG. 5 illustrates a first example embodiment of an example audio noise cancellation system.

FIG. 5 illustrates a first example embodiment of an example audio noise cancellation system 505. The audio noise cancellation system 505 may be integrated with the audio subsystem 450 of the camera 104. Alternately, the audio noise cancellation system 505 may be separate from the audio subsystem 450 of the camera 104 though work with the audio subsystem 450 of the camera 104.

The audio noise cancellation system 505 may be configured to address noise originating from noise generating components associated with the aerial vehicle 110. By way of example, noise transmitted through the air may be referenced as air noise and noise transmitted through mechanical components may be referenced as vibrational noise. For example, air noise may be generated from operation of the motor 240 and/or the propeller 140. In this example, the number of blades on the propeller 140 times the rotations per minute corresponds to the air noise that is generated. The greater the number of blades on the propeller 140, the more noise generated by the aerial vehicle 110. Also by example, vibrational noise may be generated operation of the motor 240 and/or propeller 140, which generates vibrations through the housing 130 (or frame) of the aerial vehicle 110. It is noted that the housing 130 for purposes of describing transmission of vibrational noise, the housing 130 may include the gimbal 102, the removable camera frame 106 and the camera 104. In addition, the larger the number of blades on the propeller 140, the greater the vibrational noise that may pass through the housing 130. An example of a formula for noise frequency may be:

$$F=((B)\times(\text{rpm}))/60$$

where F is frequency (Hz) of the noise, B is number of blades on the propeller 140 and rpm is the rotations per minute of the motor 240. Hence, as the number of blades increases, the noise resulting therefrom increases in frequency.

In addition to noise from motors 240, vibrational noise may be caused by other mechanical components that may be present on the aerial vehicle 110. For example, vibrational noise may originate from motors of the gimbal 102 or landing gear.

In some example embodiments, the air noise frequency and/or vibrational noise frequency of each mechanical component may vary. Vibrational noise characteristics for a mechanical component may vary due to mechanical tolerances and/or manufacturing imperfections. For example, one or more motors 240 may generate an air noise frequency that differs from one or more other motors 240 in terms of revolutions per minute due to a motor imbalance. In another example, motors of the gimbal 102 may have a particular air noise frequency. Other mechanical components also may have particular air noise frequencies. The mechanical components, for example, the motors 240 and motors of the gimbal 102, also may have particular operational characteristics leading to particular vibrational noise frequencies. Hence, the characteristics of noise frequency may be based on and/or may include a baseline (or reference) profile of each noise generating component. The baseline profile includes the baseline noise parameters to filter out from an audio signal.

The operational baseline profile may be manufacturer provided and/or may be constructed from operational testing (e.g., through a calibration process such as testing in an anechoic chamber under a wide range of operational conditions; the wide range of conditions may be predefined and tracked via a database, table or other file system that may be retrievable). The operational baseline profile may be stored as a vibrational noise signal parameter and/or air noise signal parameter for later reference in filtering an audio signal. It is noted that the vibrational noise signal parameter of each component, e.g., motors 240, motors of the gimbal 102, may differ. The vibrational noise signal parameter may be stored in decibels (db) and/or frequency (Hz) in a look up table (see below, e.g., look up table 535) for later reference in filtering (or "cleaning") an audio signal. It is noted that the noise to frequency curve of the noise frequency through the air may differ from the noise frequency through the housing 130. In addition, it is noted that the baseline profile also may include particulars of a microphone, e.g., of a camera 104, that will capture noise from the particular components. The microphone profile of the camera 104 may provide factors such as microphone quality and location on the camera that may be a relevant metadata factor for the baseline profile.

As noted the baseline profile may be stored in a look up table (LUT). Alternatively, or in addition, the profile may be stored in an $n^x$ matrix, where n may correspond to the number of metadata of collected in operation and x may correspond to the range of variations of the noise generating components. The metadata may include operational data that may affect a component resulting in noise, e.g., air noise and/or vibrational noise. For example, the metadata for a motor 240 may include rotations per minute, velocity, acceleration, and/or fed drive current. A data structure that may represent the baseline profile for noise for each component that may generate noise under a wide range of conditions may be, for example, as follows for each metadata:

$$\Sigma_i^n x^i$$

which is P the product from i to n and x. As this data structure may be large, it is noted that it may be stored on a computing system configured to store large data sets and portions of it may be packaged into smaller data sets for downloading onto local computer systems and/or the aerial vehicle 110. For example, the range of metadata of interest could be reduced, thereby reducing the data set, for operation within particular ranges and conditions. For example, the data set may correspond to particular ranges of operation of noise generating components of the aerial vehicle 110 such as the motors 240, propellers 140, and/or motors of the gimbal 102.

Turning now to the audio noise cancellation system 505, it may include a noise analyzer (or noise analyzer module) 515 and a filter 530. The noise analyzer 515 may include an audio capture module 520 and a metadata module 525. In the example embodiment of FIG. 5, the filter 530 may include a look up table (LUT) 535.

The noise analyzer 515 may be configured to receive an audio signal 510. The audio signal 510 may be captured through a microphone, e.g., on the camera 104. Within the noise analyzer 515, the audio capture module 520 receives the audio signal 510. The audio signal 510 may include noise (or noise signal) within it. The audio capture module 520 may condition the signal in some example embodiments. Examples of conditioning the audio signal 510 include, for example, amplifying the audio signal 510, applying an early stage filter to remove identifiable spurious portions of the audio signal 510, and/or isolate portions of the audio signal 510 for processing.

The noise analyzer 515 may retrieve noise parameters from the metadata module 525. The metadata module 515 may be configured to identify the noise generating components operating on the aerial vehicle 110. Specifically, the metadata module 525 collects the noise information corresponding to the operational conditionals of the aerial vehicle 110 at the time of the audio capture.

By way of example, the metadata module 525 may collect information corresponding to the noise generating components in operation, e.g., the motors 240, the propellers 140, the motors of the gimbal 102. The metadata module 525 may store operational ranges and/or location of the component on the aerial vehicle 110. The metadata module 525 may be configured to store (or log) and/or transmit (e.g., to a remote database) any of the collected information corresponding to the noise generating components.

The collected noise information by the metadata module 525 may include the noise in decibels (db) and/or frequency (Hz) for a noise generating component, for example, when it is operating (e.g., operational noise). The collected information also may include associate (or corresponding) information, for example, velocity, acceleration, and/or time. For example, the metadata module 525 may collect information on velocity and/or acceleration of the aerial vehicle 110, which may in turn be used to determine the rotations per minute of the motors 240 and/or propellers 140. The metadata module 525 may collect information on the movement of the motors of the gimbal 102 or a direction of a captured image, which may be used to determine the direction and speed the motors of the gimbal 102 moved at a particular time. The metadata module 525 may collect information on other motor components such as motors of the landing gear and motors of the arms. In addition, the velocity and/or acceleration information may also be used to determine vibrational noise of non-moving mechanical components, e.g., vibrational noise due to acceptable tolerances between physical parts of the aerial vehicle 110. The metadata module 525 also may collect time information to map with the audio signal to determine a baseline profile for the noise generating component to filter noise under particular operating conditions at the particular time in a post processing phase.

Continuing with the example of collected noise information, the air noise for a motor 240 may be higher when the motor operates a higher speeds (e.g., higher rotations per minute (RPM)) than at lower speeds (e.g., lower RPM). Similarly, a spinning propeller 140 may have higher noise signal parameters when operating at higher speed (e.g., higher velocity) due to greater air displacement of the propellers 140 than at lower speed (e.g., lower velocity) when there is lesser air displacement of the propellers 140. Likewise, vibrational noise may be dependent on operation. For example, vibrational noise may increase at higher speed than at lower speed. Also by example, vibrational noise may increase when travel of the aerial vehicle 110 is in a particular direction, e.g., into a headwind, initially ascending, or decrease when travel may be in another direction, e.g., descending to land.

Continuing by example, the metadata module 525 also may collect noise information corresponding to the location of the noise generating component and its distance from the collector of audio signals, e.g., microphone on the camera 104. The distance and location of noise generating components impacts the noise levels captured at, for example, the microphone. For example, motors 240 and propellers 140 closer to the microphone may generate noise levels higher than those further away from the microphone. In turn, the air noise and vibration noise from, for example, a motor 240 and/or propeller 140 at one end of an aerial vehicle 110 will be at different levels for a motor 240 and/or propeller 140 at an opposite end of the aerial vehicle 110 relative to the microphone location. The differing values of the noise signal parameters associated with the particular mechanical component (e.g., motor 240 and/or propeller 140) may be stored by the metadata module 525 along with its location and distance relative to the microphone. Other factors that may be taken into consideration for storage with (and/or part of) the noise signal parameters regarding the noise generated include, for example, the movement operation of the aerial vehicle 110 (e.g., moving left or right, descending, ascending, etc.), movement operation of other mechanical component (e.g., motors of the gimbal 102 or motors of a landing gear), and/or operational components that may be on the aerial vehicle 110 (e.g., a cooling fan).

The noise information also may include environmental factors associated with operation of the aerial vehicle 110. For example, the sensor subsystem 335 may include an anemometer, e.g., a thermal anemometer, that monitors wind speed. By way of one example, wind speed may generate noise captured by the microphone, e.g., on the camera 104, that may later be filtered out. By way of another example, as the aerial vehicle 110 is in flight, information corresponding to wind speed may be used to determine air noise and/or vibration noise impact that may be captured by a microphone, e.g., of the camera. The information corresponding to the noise signal parameters associated with the wind speed may be stored, e.g., temporarily, in the metadata module 525. It is noted that the microphone need not be on the camera 104. For example, the microphone may be on the aerial vehicle 110.

The metadata module 525 may be configured to augment the received audio signal 510 information with audio information corresponding to the noise signal parameters corresponding to the air noise and/or vibrational noise collected from the noise generating components. The augmented audio signal of the audio signal 510 and the metadata is sent to the filter 530. The filter 530 shown in FIG. 5 may include the look up table 535. The look up table 535 may be stored in a memory on the aerial vehicle 110 and/or may be available offline at a computing device for post capture processing.

The filter 530 is configured to extract the audio information corresponding to the noise parameters associated with the noise generating components as tracked through the metadata module 525. As previously noted, the look up table 535 may be configured to include the baseline noise profile information corresponding to the noise generating components of the aerial vehicle 110. The baseline profile may be the reduced data set corresponding to the particular aerial vehicle so that the data for the baseline profile may be for particular operational conditions.

Operationally, the augmented audio signal from the noise analyzer 515 is filtered by the filter 530 to subtract out the noise parameters from the various noise generating parameters identified through the metadata module. For example, the audio signal components for a particular noise generating component captured through the noise analyzer 515 may be filtered to subtract out the baseline noise parameters in the baseline profile of that noise generating component. By way of example, the filter 530 receives the augmented signal, which includes the audio signal 510 and the metadata from the noise analyzer 515. The filter 530 performs a look up of the noise generating sources and the corresponding metadata, for example, location of the component, operational speed, distance from the microphone and other relevant information. The baseline noise parameters of each component are retrieved from the look up table 535 and applied against the audio signal 510 to filter out the baseline noise parameters from the audio signal. As the audio signal 510 of the augmented audio signal is filtered for each of the noise generating components by filtering out the corresponding noise parameters from the baseline profile of that noise generating component, the resultant generated signal is a filtered (or cleaned) audio signal 540.

Figure 6:
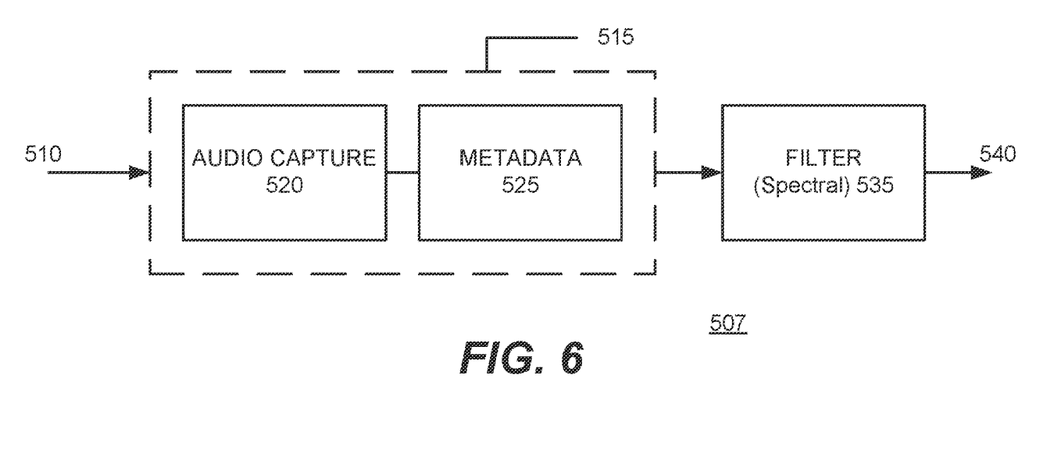
FIG. 6 illustrates a second example embodiment of an example audio noise cancellation system.

FIG. 6 illustrates a second example embodiment of an example audio noise cancellation system 507. The noise analyzer 515 is similar to that in FIG. 5 and also may include the audio capture module 520 and the metadata module 525. This example embodiment of the audio noise cancellation system includes a filter 535 that is an audio spectral filter. The spectral filter may be configured with pass filters to filter out the noise associated with the noise signal parameters corresponding to the air and/or vibrational noise in the augmented audio signal. The output from the filter 535 is the filtered signal 540. It is noted that the data for the various spectral filter may be profiled similar to that described with the look up table 535 with a baseline profile including a baseline waveform for each noise generating component. The baseline waveform is used to filter out that portion of the waveform for from the audio signal 510 for the particular noise generating component. Once the filter 535 is applies the appropriate baseline waveform to the corresponding noise generating component, the output signal is the filtered audio signal 540.

It is noted that the noise cancellation system in FIGS. 5 and 6 may be stored on the camera 104. Alternately, the noise cancellation system may be stored on the aerial vehicle 110, e.g., in a storage device as describe in FIG. 8. In other embodiments, the noise cancellation system may be in part on the camera 104 and in part on the aerial vehicle 110. In configurations in which the noise cancellation system is on the aerial vehicle 110, there may be a communication channel between the microphone, e.g., on the camera 104 and the noise analyzer 515 to receive the audio signal captured by the microphone. Where the configuration may be in part on the camera 104 and in part on the aerial vehicle 110, a communication channel may be appropriately integrated for transmission of signals from the microphone, e.g., on the camera 104, to the noise cancellation system components on the aerial vehicle 110. For example, if the filter, e.g., 530 or 535, is on the aerial vehicle 110, there may be a communication channel between the noise analyzer 515, e.g., on the camera 104 and the filter for transmitting the augmented audio signal.

Figure 7:
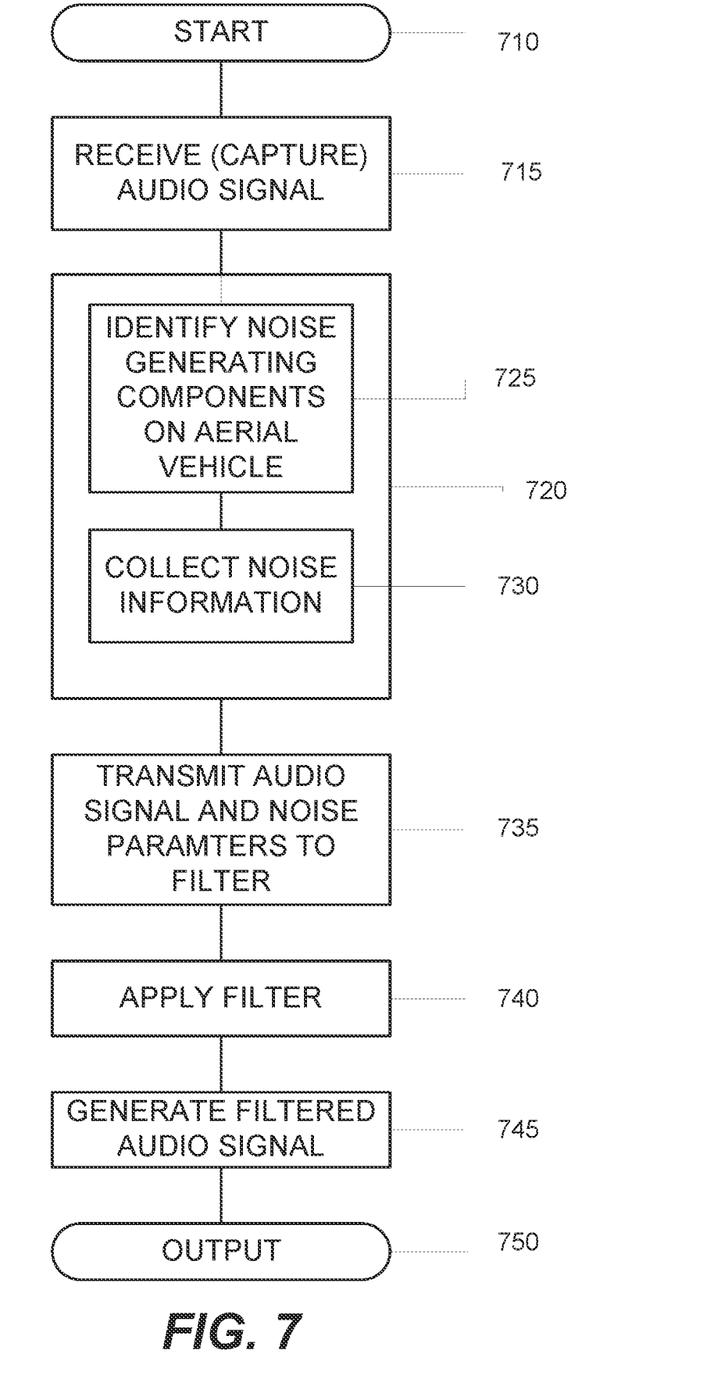
FIG. 7 illustrates an example operational process of an example audio noise cancellations system.

FIG. 7 illustrates an example operational process of an example audio noise cancellation system. The process starts 710 with the noise cancellation system, e.g., 505, 507, receiving (or capturing) an audio signal, e.g., audio signal 510 through a microphone. The process optionally may condition the signal (not shown). The process augments 720 the audio signal with metadata, for example, audio signal parameters of noise generating components. This may include tracked air and/or vibrational noise from the noise generating components as well as environmental noise, e.g., wind. Specifically, the process may identify 725 the noise generating components on the aerial vehicle 110 and collect 730 the noise information associated therewith, e.g., velocity, acceleration, movement direction, location of the component, and other data impacting noise levels for the noise generating component. This information may be metadata provided with the audio signal to generate the augmented audio signal. The augmented audio signal is transmitted 735 to a filter, e.g., filter 535, 540. The filter 535, 540 is applied 740 to filters the audio signal to remove the baseline noise parameters for the identified noise generating component parameters by using corresponding noise information. The baseline noise parameters may be noise frequencies associated with the noise generating component at the baseline operational level corresponding to the operational conditionals of the aerial vehicle 110 at the time of the audio as determined from the noise information from the metadata module 525.

Once the baseline noise parameters are filtered from the audio signal for the identified noise generating components, the process generates 745 a filtered audio signal for output 750. The process of filtering the audio signal and generating the filtered audio signal for output may be considered post processing of the audio signal and may occur on the aerial vehicle 110. Alternately, or in addition, the audio signal with augmented metadata may be stored in a storage device of the aerial vehicle 110 for subsequent downloading for post processing these steps on a computer system, e.g., a personal computer system, a server computer system, a tablet, and/or smartphone.

Example Machine Architecture

The aerial vehicle 110 and the remote controller 120 are machines that may be configured for operation by software. FIG. 8 is a block diagram illustrating components of an example machine able to read instructions from a machine-readable medium and execute them in one or more processors (or controllers). All or portions of the example machine described in FIG. 8 can be used with the aerial vehicle 110 or the remote controller 120 and/or other parts of a system that interfaces with the aerial vehicle 110 and/or remote controller 120.

In FIG. 8 there is a diagrammatic representation of a machine in the example form of a computer system 800. The computer system 800 can be used to execute instructions 824 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine in this example is a handheld controller to control the remote controlled aerial vehicle. However, the architecture described may be applicable to other computer systems that operate in the system of the remote controlled aerial vehicle with camera and mounting configuration, e.g., in setting up a local positioning system. These other example computer systems include a server computer, a client computer, a personal computer (PC), a tablet PC, a smartphone, an internet of things (IoT) appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processing units (generally processor 802). The processor 802 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 800 also includes a main memory 804. The computer system may include a storage unit 816. The processor 802, memory 804 and the storage unit 816 communicate via a bus 808.

In addition, the computer system 800 can include a static memory 806, a screen driver 810 (e.g., to drive screen, e.g., 170, such as a plasma display panel (PDP), a liquid crystal display (LCD), or a projector). The computer system 800 may also include input/output devices, e.g., an alphanumeric input device 812 (e.g., a keyboard), a dimensional (e.g., 2-D or 3-D) control device 814 (e.g., a mouse, a trackball, a joystick, a motion sensor, or other pointing instrument), a signal generation device 818 (e.g., a speaker), and a network interface device 820, which also are configured to communicate via the bus 808.

The storage unit 816 includes a machine-readable medium 822. The machine readable medium 822 may be flash, a magnetic disk, and/or optical storage. The machine readable medium 822 stores instructions 824 (e.g., software) embodying any one or more of the methodologies or functions described herein. The instructions 824 may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 may be transmitted or received over a network 826 via the network interface device 820. It is noted that in embodiments where parts of the computer system are on the aerial vehicle 110, the storage unit 816 may store the audio signal captured from, e.g., the camera 104, along with the collected metadata. The storage unit 816 also may store a subset of the data set corresponding to the baseline profiles for the potential noise generating components of the aerial vehicle 110. In embodiments in which an audio signal is filtered onboard the aerial vehicle 110, the processor 802 and memory 804 may be used to store and execute instructions 824 for applying the process of FIG. 7.

While machine-readable medium 822 is shown in an example embodiment to be a single medium, the term "machine-readable medium" should be taken to include a single medium or multiple media (e.g., a centralized or distributed database, or associated caches and servers) able to store the instructions 824. The term "machine-readable medium" shall also be taken to include any medium that is capable of storing instructions 824 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The disclosed configuration beneficially cleans received audio signals on an unmanned aerial vehicle, e.g., aerial vehicle 110. The disclosed configuration identifies audible noise from noise generating components and their corresponding audio signal parameters. The disclosed configuration tracks noise generating components corresponding to air and/or vibrational noise. Once then noise parameters are determined the disclosed configurations beneficially filter out noise of those components to generate a filtered audio signal. By knowing the audio signal parameters corresponding to tracked mechanical, aerodynamic, and environmental noise of the noise generating parameters, the disclosed configurations can quickly and efficiently clean audio signals from unwanted audible noise.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 3-12. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 802, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for automatically detecting and executing a return path for a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A system, comprising:
   a noise analyzer configured to review a captured audio signal, wherein the captured audio signal comprises baseline noise parameters and clean audio;
   a metadata module that augments the captured audio signal to generate an augmented audio signal;
   a filter configured to remove the baseline noise parameters from the captured audio signal so that the clean audio is free of the baseline noise parameters, wherein the filter comprises a look up table that comprises vibrational noise signals that are stored in decibels and/or frequency; and
   a memory to store the clean audio.

2. The system of claim 1, wherein the system comprises an unmanned aerial vehicle.

3. The system of claim 1, wherein the baseline noise parameters comprise noise frequencies associated with a noise generating component of the system.

4. The system of claim 1, wherein the filter comprises a spectral noise cancellation filter.

5. The system of claim 1, wherein the captured audio signal is filtered to remove noise from the audio signal, the noise comprising any of air noise and vibrational noise.

6. The system of claim 1, wherein the baseline noise parameters includes an operational condition of a noise generating component at a time of capture of the capture audio signal.

7. The system of claim 6, wherein the baseline noise parameters further include operational conditions of other noise generating components of the system at the time of capture of the audio signal.

8. The system of claim 6, wherein the operational condition comprises any of a velocity and an acceleration of the system.

9. The system of claim 6, wherein the operational condition comprises wind speed captured from a thermal anemometer of the system.

10. The system of claim 1, further comprising:
a motor, wherein an audio signal frequency generated from the motor is based on a speed of the motor and the audio signal frequency is one part the baseline noise parameters.

11. The system of claim 1, wherein the filter is further configured to clean the audio signal based on a baseline profile.

12. The system of claim 11, wherein the baseline profile is derived from testing in an anechoic chamber under a predefined range of conditions.

13. An unmanned aerial vehicle, comprising:
components on the unmanned aerial vehicle;
a noise analyzer configured to analyze an audio signal and generate an analyzed audio signal, wherein the audio signal comprises noise associated with operation of the components on the unmanned aerial vehicle;
a metadata module that augments the captured audio signal to generate an augmented audio signal; and
a filter configured to modify the audio signal based by removing the noise associated with the operation of the components on the unmanned aerial vehicle based on the analyzed audio signal to produce a filtered audio signal, wherein the filter comprises a look up table that comprises vibrational noise signals that are stored in decibels and/or frequency; and
memory configured to store the filtered audio signal.

14. The unmanned aerial vehicle of claim 13, wherein the noise analyzer is further configured to identify the noise generating components of the unmanned aerial vehicle and to determine noise information for each of the noise generating components.

15. The unmanned aerial vehicle of claim 13, wherein the filter is further configured to alter the audio signal based on a baseline profile.

16. A method, comprising:
receiving an audio signal;
analyzing the audio signal with a noise analyzer, wherein the audio signal comprises baseline noise parameters and audio;
a metadata module that augments the captured audio signal to generate an augmented audio signal;
filtering the audio signal, with a filter, based on the baseline noise parameters;
retrieving the baseline noise parameters from a look up table in the filter, wherein the baseline noise parameters comprise vibrational noise signals that are stored in decibels and/or frequency; and
storing the audio in memory.

17. The method of claim 16, further comprising:
identifying noise generating components on an unmanned aerial vehicle;
determining noise information for the noise generating components; and
removing the noise information from the audio signal with the filter.

18. The method of claim 16, wherein the baseline noise parameters are noise with a known decibel and/or frequency, and wherein the filtering includes removing the noise with the known decibel and/or frequency from the audio.

19. The system of claim 1, wherein the noise signals include a frequency curve comprising a noise frequency through air and the housing so that differences in frequency are included in the look up table.

20. The unmanned aerial vehicle of claim 13, wherein the noise signals include a frequency curve comprising a noise frequency through air and the housing so that differences in frequency are included in the look up table.

* * * * *